United States Patent
Story

[15] 3,663,033
[45] May 16, 1972

[54] HANDLE ON HAND TRUCK

[72] Inventor: Thomas Story, Portland, Oreg.
[73] Assignee: Harco Products, Inc., Portland, Oreg.
[22] Filed: Nov. 20, 1970
[21] Appl. No.: 91,502

[52] U.S. Cl..................280/47.27, 74/551.1, 280/47.17, 287/54 E
[51] Int. Cl...........................................B62b 5/06
[58] Field of Search.............280/47.17, 47.24, 47.25, 47.26, 280/47.27, 47.28, 47.29, 47.37; 16/110 R, 111 R, 114 R; 74/551.1; 287/54 B, 54 E

[56] References Cited

UNITED STATES PATENTS

| 894,282 | 7/1908 | Neuens | 280/47.27 |
| 1,772,951 | 8/1930 | Klein | 280/47.29 X |
| 2,423,065 | 6/1947 | Garbarino | 280/47.27 |
| 3,276,550 | 10/1966 | Honeyman | 280/47.27 X |

FOREIGN PATENTS OR APPLICATIONS

| 444,087 | 3/1936 | Great Britain | 287/54 E |
| 352,911 | 4/1961 | Switzerland | 280/47.27 |

*Primary Examiner*—Benjamin Hersh
*Assistant Examiner*—Leslie J. Paperner
*Attorney*—Lee R. Schermerhorn

[57] ABSTRACT

A separate handle part has a jaw portion overlying a cross bar portion of the truck frame. A socket fitting on the upper end of a central upright tubular member of the frame has a jaw portion underlying the cross bar. The two jaw members are clamped on the cross bar by a screw having threaded engagement with a plug in the upper end of the central frame member. The plug and upper end of the central frame member are tapered to fit in a tapered socket in the socket fitting whereby the screw holds all the parts securely together.

4 Claims, 5 Drawing Figures

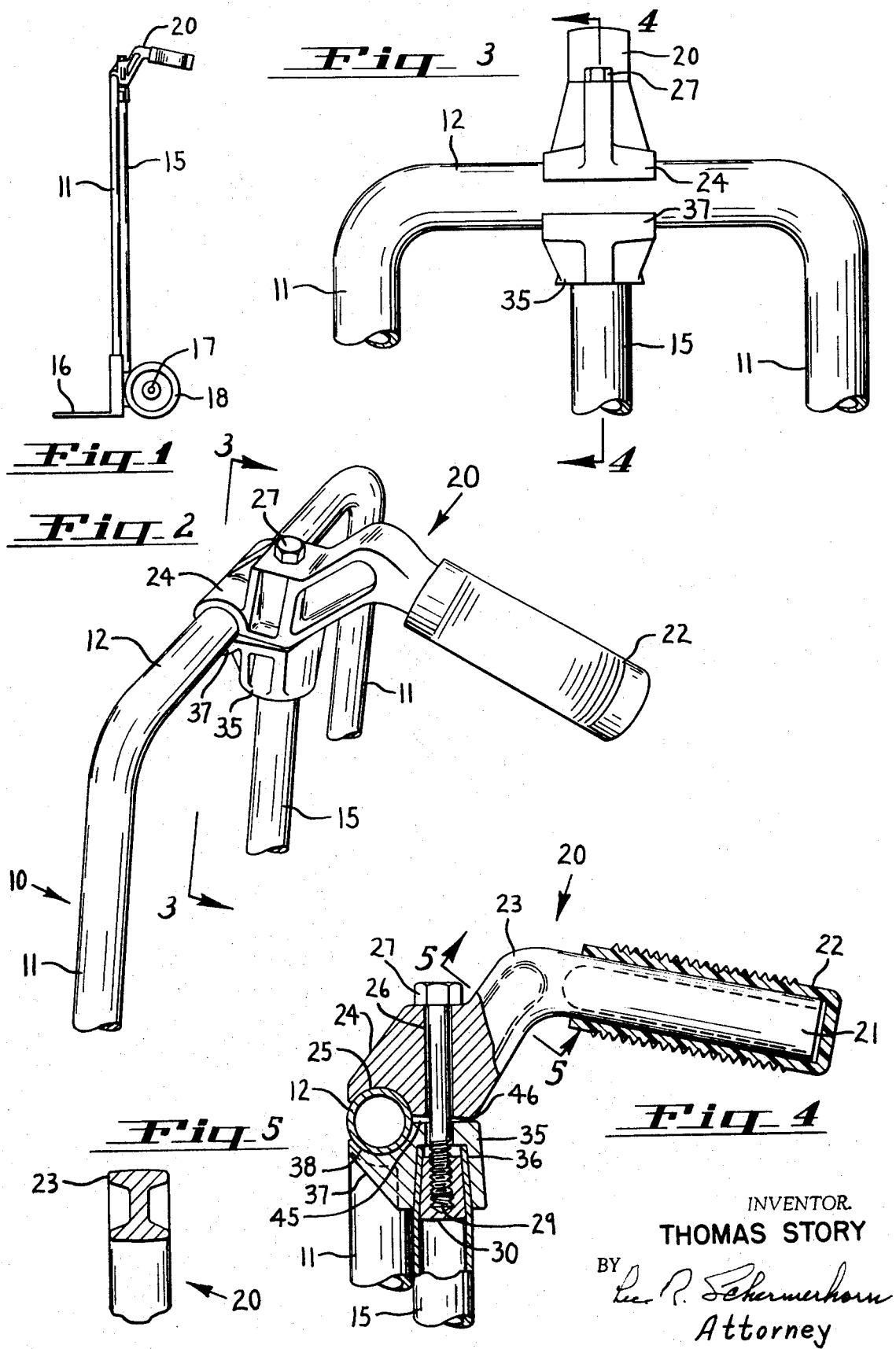

HANDLE ON HAND TRUCK

BACKGROUND OF THE INVENTION

This invention relates to an improved handle construction for a hand truck.

In a common form of construction for light-weight, two-wheeled hand trucks the frame comprises an inverted U-shaped tube and a second tubular member welded at its upper end to the cross bar of the U-shaped tube. Just above the weld the second member is bent rearwardly approximately at right angles to form a handle.

The truck is adapted to stand on the floor in upright position. It frequently happens that the truck is overbalanced in a rearward direction, causing the end of the handle to strike the floor with a hard blow. In time these impacts fracture the weld between the two frame members, rendering the truck prematurely unserviceable even though the rest of the structure may be in good operating condition. The life of such hand trucks could be considerably prolonged if a better handle were provided which would withstand the shocks of ordinary use and occasional misuse without breakage of the joint between the handle and the U-shaped frame member.

Objects of the invention are, therefore, to provide an improved handle on a hand truck, to provide a handle which will withstand the shock of impact against the floor when the truck is tipped over backward, to provide a handle construction which eliminates the usual welded joint between the handle and U-shaped frame member, and to provide a handle of simple construction in which a single clamp screw secures a separate handle to straight and U-shaped frame members of the truck.

SUMMARY OF THE INVENTION

In the present construction, a separate handle is provided instead of extending the central frame member and bending it to form an integral handle part. A socket fitting on the upper end of the center frame member has a lower jaw portion to engage the under side of the cross bar on the U-shaped frame member. The handle has a jaw portion overlying the cross bar. A single vertical screw through the handle part has threaded engagement in a plug in the center frame member to clamp the handle securely on both frame members.

These handle parts are sufficiently rugged and durable to withstand hard impacts against the floor when the truck is tipped over without causing any breakage of the parts. Should any looseness occur it is only necessary to tighten the clamp screw. If any breakage should occur from unusually rough handling, only the handle part need be replaced to put the truck back in serviceable condition thereby greatly extending the normal life of the truck.

The invention will be better understood and the foregoing and other objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is a side elevation view of a hand truck embodying the invention;
FIG. 2 is a perspective view of the handle construction;
FIG. 3 is a view on the line 3—3 in FIG. 2;
FIG. 4 is a view on the line 4—4 in FIG. 3; and
FIG. 5 is a view on the line 5—5 in FIG. 4.

DESCRIPTION OF THE PREFERRED EMBODIMENT

The truck has a first frame member which is a U-shaped tube having a pair of vertical legs 11 at the opposite ends of a horizontal top cross bar portion 12. A second frame member comprises a vertical tube 15 in a central position between the legs 11. The frame further includes a conventional blade 16 connected to the frame parts 11 and 15 and having an axle 17 for a pair of wheels 18.

The parts thus far identified are employed in a common form of construction of light-weight hand trucks having a single handle in the same position as the present handle 20. In conventional construction, however, the center tube 15 is welded to the cross bar 12 and the handle part comprises simply the rearwardly bent upper end of the tube 15 itself. Thus, it will be apparent in FIG. 1 that when the truck is inadvertently tipped over backward, the end of the handle will strike the floor or pavement with considerable shock, eventually fracturing the weld between tube 15 and cross bar 12.

Once the weld has been fractured in this manner, re-welding is usually effective for only a short time. Because of the inconvenience and cost of taking the truck out of service to get it re-welded, and because of the lack of permanence of the repair, there is a tendency among users to merely discard the truck and buy a new one instead of attempting repair.

The present handle 20 is preferably made of a cast aluminum alloy having a hollow tubular end portion 21 to receive a plastic hand grip 22. A gooseneck portion 23 connects the tubular end portion 21 with a forwardly projecting jaw portion 24 having an arcuate under surface 25 to overlie and fit the curvature of cross bar 12. Intermediate the gooseneck portion 23 and jaw portion 24 is a smooth bore vertical hole 26 to receive a cap screw 27.

The lower end of screw 27 has threaded engagement with a tapped hole 29 in a tapered plug 30 inserted in the upper end of the tube 15. A second aluminum alloy casting 35 has a tapered socket 36 to receive the upper end of tube 15 and a forwardly extending jaw portion 37 having an arcuate groove 38 to fit the curvature of the under side of cross bar 12.

The upper end of tube 15 is swaged to form a taper corresponding to the taper of plug 30 and socket 36. The conical shape of plug 30, tube 15 and socket 36 prevents the plug from pulling out of the upper end of the tube when screw 27 is tightened and holds the tube securely in the socket. The parts are proportioned so as to leave a gap at 45 between the jaws 24 and 37 so that when screw 27 is tightened the jaws will firmly grip the cross bar 12. Preferably, a heel portion of handle 20 bears against the top of socket fitting 35 at 46 to apply leverage to the jaws.

Thus, the single screw 27 secures the handle 20 to both cross bar 12 and tube 15 without any welds. The present handle will safely withstand hard impacts against the floor without any damage to the parts but, if the handle should be broken, it may easily be replaced at small cost by simply removing screw 27. If rough usage should cause the handle to become loose without breaking, the screw 27 may be tightened without requiring special tools or service.

Having now described my invention and in what manner the same may be used, what I claim as new and desire to protect by Letters Patent is:

1. In a hand truck having a frame comprising a vertical tube and a horizontal cross bar, a handle having a jaw portion engaging said cross bar, a socket fitting on the end of said tube having a jaw portion engaging said cross bar in opposed relation to said jaw portion on said handle, a plug in said tube, and a screw extending through said handle and socket fitting and having threaded engagement in said plug to clamp said jaw portions on said cross bar.

2. The invention defined in claim 1, said handle jaw portion overlying said cross bar and said socket fitting jaw portion underlying said cross bar.

3. The invention defined in claim 1, said socket fitting having a tapered socket and said plug and tube end having a corresponding taper to anchor said plug in said tube and anchor said tube in said socket.

4. The invention defined in claim 1, said handle extending at approximately right angles to said tube and cross bar.

* * * * *